Patented Aug. 24, 1926.

1,597,426

UNITED STATES PATENT OFFICE.

JACOB BILSKY, OF CHICAGO, ILLINOIS, ASSIGNOR TO A. B. DICK COMPANY, OF CHICAGO, ILLINOIS, A CORPORATION OF ILLINOIS.

STENCIL SHEET.

No Drawing.  Application filed December 12, 1923. Serial No. 680,273.

In carrying out the invention, I employ an open, porous base, such as the Japanese paper commonly known as "yoshino", and this I provide with a coating which, when applied, is mainly cellulose xanthate or viscose, but which in a short time, due to spontaneous decomposition, regenerates cellulose and cellulose hydrates. The ultimate coating, therefore, consists mainly of these products. They are, however, partially or wholly neutralized and, in addition, modified by treatment with tempering or other agents, which, after the coating has been applied and has set, leave it in condition for use, as by impressing such coating with the type of a writing-machine. As a neutralizing agent, an organic acid such as butyric or malonic may be used. Such organic acids do not decompose the cellulose xanthate, but, used in excess, precipitate them in an insoluble state, and papers so treated, immediately after the coating is applied, are subject to change on further standing and exposure, due to the spontaneous decomposition of the cellulose xanthates into cellulose and cellulose hydrates. If the neutralization be done with mineral acids, then the cellulose xanthate is immediately converted into cellulose or its hydrates.

In preparing the viscose, I take 100 grams of cotton and soak this for approximately twenty-four hours in 1200 grams of caustic soda solution, such solution containing 18 grams of caustic soda to 100 grams of distilled water. Other caustic alkalis may serve a similar purpose. After such soaking, the cotton is removed from the solution and pressed to expel the surplus moisture until the original 100 grams of cotton, plus a part of the absorbed solution, weighs approximately 300 grams. This cotton is then put in a closed vessel and allowed to stand for forty-eight hours, after which there is added thereto from 60 to 70 grams of carbon-bisulphide. The mass is then stirred or otherwise agitated for a suitable time (four hours will usually be found sufficient), and then 350 grams of a 15% solution of caustic soda are added and the mass allowed to stand for about twelve hours. It is now soluble, and sufficient distilled water is added to dissolve the cotton. Such solution is, of course, alkaline, and, for the purpose of this invention I neutralize (or partially neutralize) the same with an organic acid, such as malic, butyric or malonic acid, of which, when butyric acid is used, I prefer adding from 40 to 50 grams which may be used without causing precipitation of the cotton. The amount of organic acid which may be used at this point and the degree to which the solution may be neutralized depend primarily upon the state or form of the cellulose, that is, whether the $C_6$, $C_{12}$ or $C_{24}$ form. At this stage, the solution is, or should be, of such a consistency as to enable it to be readily taken up by the absorbent yoshino paper. Such consistency may be controlled by the quantum of distilled water added as above described.

In conjunction with the cellulose xanthate, prepared as above described, I employ a tempering agent or agents as above indicated, the same being combined with such xanthate prior to the coating operation so that the coating solution may be complete in one bath or, in the alternative, such agent or agents may be employed in a separate bath, the yoshino being first coated with the xanthate and then the sheet so coated being treated in the bath containing the tempering agent or agents. In either event, the latter may be the same and employed in substantially the same proportions. The tempering solution which I prefer to employ consists of 30 parts, by weight, of glycerin, 5 parts, by weight, of a sulphonated oil such as Turkey red oil, and 65 parts, by weight, of distilled water.

In the coating of the yoshino, the usual process may be followed, that is, the yoshino sheets may be "drawn" over the top of the solution, thereby becoming thoroughly impregnated, and the excess solution may be removed by withdrawing the coated yoshino from the top of the bath in contact with a wire, by means whereof such excess solution will be returned to the bath. The coated sheet may then be hung for a short time (a few hours at ordinary room temperature) to partially dry or set. If the xanthate and tempering agent or solution have been combined in a single bath, as above suggested, the coating or impregnating operation is now complete and the resulting sheet ready for use upon a suitable writing machine. If the two-bath process be employed, the yoshino sheet, after being drawn over the xanthate solution, is, as before, hung for a short time and then drawn over the tempering solution after which it is hung again and so completed ready for practical use.

It is to be understood that the present invention is not limited to what is technically known as cellulose xanthate or viscose, particularly in view of the decomposition of the material so known into cellulose and its hydrates. Accordingly, in the broader claims appended hereto, I shall use the word cellulose as including not only cellulose, but also its hydrates and decomposition products, and this regardless of the process by which these may be obtained. Similarly, save where specifically enumerated, the invention is not confined to the particular tempering agents or solution above described. They serve primarily to swell and toughen and prevent or retard the hardening of the cellulose, and it may well be that this or a somewhat similar result may be accomplished by other substances of the same general class.

Having now described my invention, what I claim is:—

1. The process of preparing a type-impressible stencil sheet which consists in coating a base of open material with a water soluble substance which spontaneously becomes impermeable to ink and subjecting said substance to the action of a neutralizing agent.

2. The process of preparing a type-impressible stencil sheet which includes coating a base of open material with cellulose xanthate.

3. The process of preparing a type-impressible stencil sheet which includes coating a base of open material with cellulose xanthate and a neutralizing agent.

4. The process of preparing a type-impressible stencil sheet which includes coating a base of open material with cellulose xanthate and a substance which precipitates the cellulose xanthate in an insoluble state.

5. The process of preparing a type-impressible stencil sheet which includes coating a base of open material with cellulose xanthate and an organic acid.

6. The process of preparing a type-impressible stencil sheet which includes coating a base of open material with cellulose xanthate and a mineral acid.

7. A type-impressible stencil sheet coating including a water soluble material which spontaneously becomes impermeable to ink.

8. A type-impressible stencil sheet coating including a water soluble material which spontaneously becomes impermeable to ink, and a base of open, porous material to which said coating has been applied while in water-soluble condition.

9. In a type-impressible stencil-sheet, a base of open, porous material having a coating of a water-soluble compound including cellulose, spontaneously becoming impermeable to ink.

10. In a type-impressible stencil-sheet, a base of open, porous material having a coating of a water-soluble compound including cellulose, spontaneously becoming impermeable to ink after being applied to the sheet.

11. In a type-impressible stencil-sheet, a base of open, porous material having a coating of a neutralized water-soluble compound containing cellulose.

12. In a type-impressible stencil-sheet, a base of open, porous material having a coating of a water-soluble compound containing cellulose and a tempering agent.

13. In a type-impressible stencil-sheet, a base of open, porous material having a coating of a neutralized water-soluble compound containing cellulose and a tempering agent.

14. In a type-impressible stencil-sheet, a base of open, porous material having a coating including cellulose and glycerin.

15. In a type-impressible stencil-sheet, a base of open, porous material having a coating including a water-soluble compound containing cellulose and glycerin.

16. In a type-impressible stencil-sheet, a base of open, porous material having a coating including cellulose and Turkey red oil.

17. In a type-impressible stencil-sheet, a base of open, porous material having a coating including a water-soluble compound containing cellulose and Turkey red oil.

18. In a type-impressible stencil-sheet, a base of open, porous material having a coating including cellulose, glycerin and Turkey red oil.

19. In a type-impressible stencil-sheet, a base of open, porous material having a coating including a water-soluble compound containing cellulose, glycerin and Turkey red oil.

20. In a type-impressible stencil-sheet, a base of open, porous material having a coating including cellulose and water.

21. In a type-impressible stencil-sheet, a base of open, porous material having a coating including a water-soluble compound containing cellulose and water.

22. In a type-impressible stencil-sheet, a base of open, porous material having a coating including cellulose, glycerin and water.

23. In a type-impressible stencil-sheet, a base of open, porous material having a coating including a water-soluble compound containing cellulose, glycerin and water.

24. In a type-impressible stencil-sheet, a base of open, porous material having a coating including cellulose, Turkey red oil and water.

25. In a type-impressible stencil-sheet, a base of open, porous material having a coating including a water-soluble compound containing cellulose, Turkey red oil and water.

26. In a type-impressible stencil-sheet, a base of open, porous material having a coating including cellulose, glycerin, Turkey red oil and water.

27. In a type-impressible stencil-sheet, a base of open, porous material having a coating including a water-soluble compound containing cellulose, glycerin, Turkey red oil and water.

28. In a type-impressible stencil-sheet, a base of open, porous material having a coating including a water-soluble compound containing cellulose, neutralized at least in part.

This specification signed this 28th day of November, 1923.

JACOB BILSKY.